(12) United States Patent
Uchida et al.

(10) Patent No.: US 10,781,130 B2
(45) Date of Patent: Sep. 22, 2020

(54) HEAT TREATMENT APPARATUS

(71) Applicant: SHIN-ETSU CHEMICAL CO., LTD., Tokyo (JP)

(72) Inventors: Kazuya Uchida, Ibaraki-ken (JP); Takashi Koshigai, Gunma-ken (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 649 days.

(21) Appl. No.: 15/443,379

(22) Filed: Feb. 27, 2017

(65) Prior Publication Data

US 2017/0253520 A1 Sep. 7, 2017

(30) Foreign Application Priority Data

Mar. 3, 2016 (JP) ................................. 2016-041538

(51) Int. Cl.
 *C03B 32/02* (2006.01)
 *C03B 37/014* (2006.01)
 (Continued)

(52) U.S. Cl.
 CPC .......... *C03B 32/02* (2013.01); *C03B 37/0146* (2013.01); *C03B 37/01446* (2013.01);
 (Continued)

(58) Field of Classification Search
 CPC ..... C03B 32/02; C03B 37/10; C03B 37/0146; C03B 37/01446; H01L 21/67109;
 (Continued)

(56) References Cited

U.S. PATENT DOCUMENTS 4,969,941 A 11/1990 Kyoto et al.
2009/0071953 A1* 3/2009 Hamaguchi ....... H01L 21/67109
 219/600
(Continued)

FOREIGN PATENT DOCUMENTS

JP S62-153130 7/1987
JP H02-018333 1/1990
 (Continued)

OTHER PUBLICATIONS

Japanese Office Action in JP 2016-041538 dated Feb. 5, 2019 with English language translation.
(Continued)

*Primary Examiner* — Phuong T Nguyen
(74) *Attorney, Agent, or Firm* — Greenblum & Bernstein, P.L.C.

(57) ABSTRACT

A heat treatment apparatus includes: a furnace core tube made of silica glass; a heater provided adjacent to the furnace core tube, the heater heating a heating region; and a moving mechanism supporting a porous glass base material and relatively moving the porous glass base material with respect to the heater in the furnace core tube in a state where the heating region is heated by the heater to make the porous glass base material pass through the heating region. The heat treatment apparatus includes a thin-walled part provided in a region adjacent to a portion located in the heating region in the furnace core tube, the thin-walled part having a thickness of glass less than that of the portion located in the heating region.

5 Claims, 6 Drawing Sheets

(51) Int. Cl.
    *C03B 37/10*     (2006.01)
    *F27B 1/00*     (2006.01)
    *F27B 1/12*     (2006.01)
    *F27B 9/14*     (2006.01)
    *F27D 11/02*     (2006.01)

(52) U.S. Cl.
    CPC .............. *C03B 37/10* (2013.01); *F27B 1/005* (2013.01); *F27B 1/12* (2013.01); *F27B 9/142* (2013.01); *F27D 11/02* (2013.01); *C03B 2205/10* (2013.01); *C03B 2205/80* (2013.01)

(58) Field of Classification Search
    CPC ... H01L 21/67115; H05B 6/105; F27B 1/005; F27B 1/12; F27B 9/142; F27D 11/02
    USPC ...... 373/18, 19, 20, 22, 27, 30, 63; 219/216, 219/390, 469, 535, 600
    See application file for complete search history.

(56) References Cited

U.S. PATENT DOCUMENTS

2009/0211302 A1     8/2009   Inoue et al.
2014/0345332 A1*  11/2014  Otosaka .............. C03B 37/0146
                                                65/427

FOREIGN PATENT DOCUMENTS

| JP | 07-10583 | 1/1995 |
|----|----------|--------|
| JP | 2008-031032 | 2/2008 |
| JP | 2014-65642 | 4/2014 |

OTHER PUBLICATIONS

Office Action issued in Japan Counterpart Patent Appl. No. 2016-041538, dated Sep. 25, 2018 , along with an English translation thereof.

India Pre-grant Opposition, India Patent Office, Application No. 201714007492, issued Feb. 3, 2020, with English translation thereof.

\* cited by examiner

HEAT TREATMENT APPARATUS

CROSS-REFERENCE TO RELATED APPLICATION

This non-provisional application claims priority under 35 U.S.C. § 119(a) from Japanese Patent Application No. 2016-041538, filed on Mar. 3, 2017, the entire contents of which are incorporated herein by reference.

BACKGROUND

Technical Field

The present invention relates to a heat treatment apparatus for subjecting a porous glass base material for optical fibers to a heat treatment to manufacture an optical fiber base material. In particular, the present invention relates to a furnace core tube used in the heat treatment apparatus.

Related Art

Examples of a method for manufacturing a porous glass base material for optical fibers include methods referred to as a VAD method and an OVD method. In these methods, first, a glass raw material is combusted in a flame to generate glass microparticles. The generated glass microparticles are deposited on a rotating target rod in the axial direction or the radial direction to manufacture a porous glass base material.

As a heat treatment apparatus for vitrifying a porous glass base material, a heat treatment apparatus 1 as shown in FIG. 1 is used. The heat treatment apparatus 1 includes a heater 2, a furnace body 3 covering the heater 2, and a furnace core tube 4 installed on the inner side of the heater, the furnace core tube made of silica glass. A similar apparatus is described in, for example, JP 2014-065642 A and the like.

The upper end of the furnace core tube 4 is closed by an upper lid 5 in which a penetration hole is opened. A support rod 6 supporting a porous glass base material 10 is attached to the upper lid 5 through the penetration hole. A gas introduction port 7 for supplying a process gas such as a helium (He) gas or a chlorine (Cl$_2$) gas is provided in the lower part of the furnace core tube. A gas exhaust port 8 exhausting a gas is provided in the upper lid.

When the porous glass base material 10 is repeatedly subjected to a heat treatment, the furnace core tube 4 is etched by the process gas introduced during the heat treatment to cause a decrease in the thickness of glass, which causes cracks in the furnace core tube 4. On the other hand, the long operating life of the furnace core tube 4 can be achieved by increasing the thickness of the glass of the furnace core tube 4.

A portion located in a heating region 20 heated by the heater 2 in the furnace core tube 4 is previously subjected to a heat treatment (aging treatment) using the heater 2 before the heat treatment of the porous glass base material 10 is started, to crystallize the glass, which can prevent the furnace core tube 4 from being deformed during the heat treatment of the porous glass base material 10.

SUMMARY OF THE INVENTION

When the porous glass base material is treated by using the above heat treatment apparatus, the porous glass base material attached to the support rod is successively moved downward to make the porous glass base material pass through the heating region, and thereby the porous glass base material is successively heated from the lower end of the porous glass base material to obtain transparent glass. When the porous glass base material thus heated is repeatedly moved to the lower side of the heating region, the crystallization of glass partially occurs on the lower side of the heating region in the furnace core tube. Thus, in the portion in which the glass is crystallized, tube cracks are apt to occur. This disadvantageously causes the furnace core tube to be replaced when the porous glass base material is repeatedly subjected to a heat treatment about a few dozen times.

In order to solve the above problems, a heat treatment apparatus of the present invention includes: a furnace core tube made of silica glass; a heater provided adjacent to the furnace core tube, the heater heating a heating region; and a moving mechanism supporting a porous glass base material and relatively moving the porous glass base material with respect to the heater in the furnace core tube in a state where the heating region is heated by the heater to make the porous glass base material pass through the heating region. The heat treatment apparatus includes a thin-walled part provided in a region adjacent to a portion located in the heating region in the furnace core tube, the thin-walled part having a thickness of glass less than that of the portion located in the heating region.

In the present invention, the thickness of the glass of the thin-walled part may be 75% or less of that of the furnace core tube in the heating region. The thickness of the glass of the thin-walled part may be from 4 mm to 6 mm.

In the present invention, the heat treatment apparatus may include the thin-walled part provided in a downstream region adjacent to the heating region on a downstream side for a moving direction of the porous glass base material when passing through the heating region.

The portion located in the heating region in the furnace core tube may be previously heated by the heater to crystallize the glass.

Advantageous Effects of Invention

The present invention prevents cracks from occurring in a furnace core tube to allow the furnace core tube to be used for a long period of time.

DETAILED DESCRIPTION OF THE EMBODIMENTS

Figure 2:
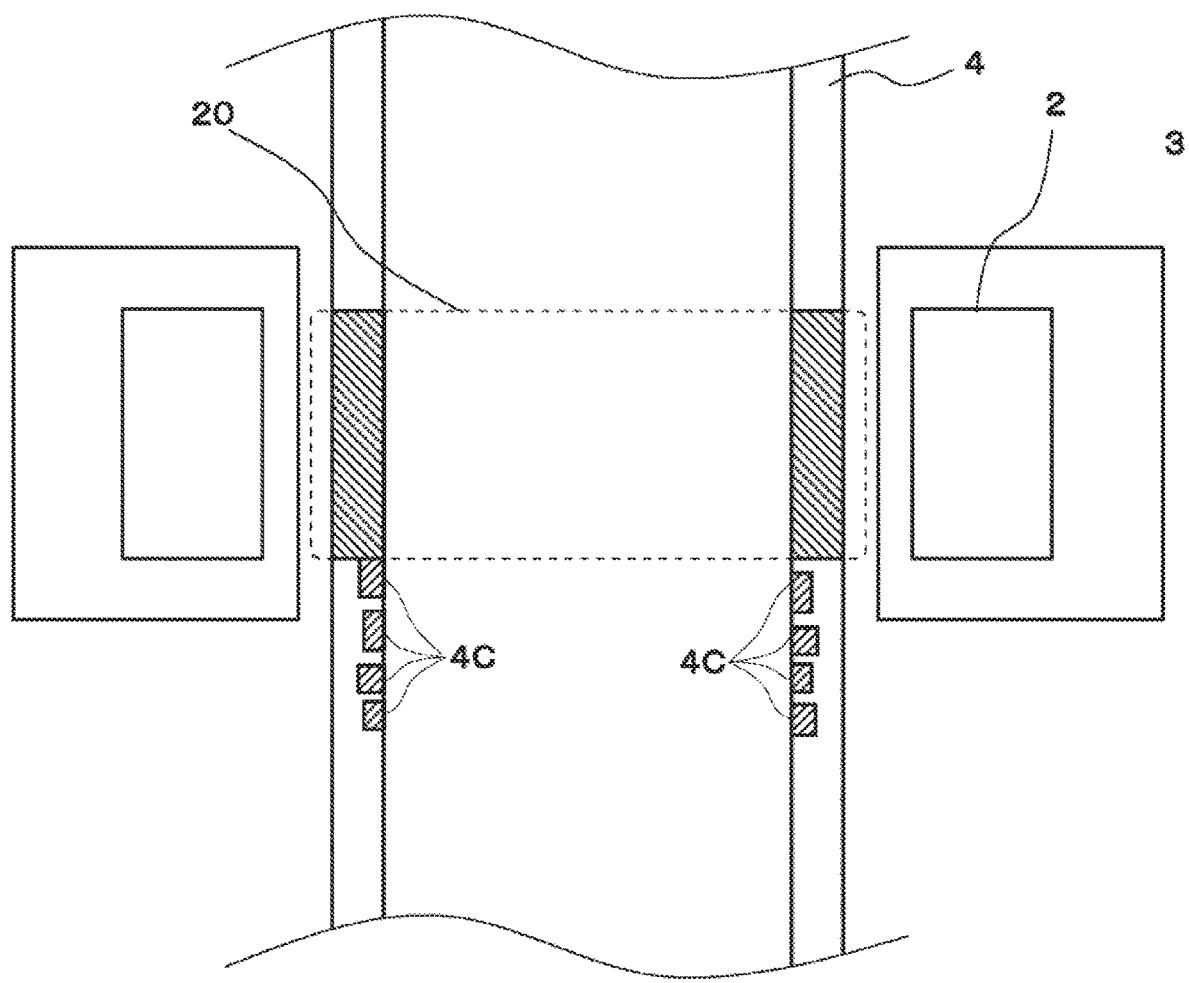
FIG. 2 is an enlarged view schematically showing a heating region 20 and its circumference in a conventional heat treatment apparatus.

As described above, when a treatment for moving a porous glass base material 10 to the lower side of a heating region 20 while heating the porous glass base material 10 in the heating region 20 to obtain transparent glass is repeatedly performed, a portion located on the lower side of the heating region 20 in a furnace core tube 4 is also heated from the inner side of the furnace core tube 4 by radiation heat from the porous glass base material 10 having a high temperature after the treatment. Thus, when a region 21 adjacent to the heating region 20 in a lower side (that is, a region adjacent to the heating region 20 on a downstream side for the moving direction of the porous glass base material 10 during a heat treatment (hereinafter, merely referred to as a "downstream region")) is repeatedly heated by the radiation heat from the porous glass base material 10 having a high temperature, the glass of the furnace core tube 4 in the downstream region 21 is crystallized. As shown in FIG. 2, portions 4C in which crystallization occurs are gradually formed from the inner side of the furnace core tube 4 largely receiving the radiation heat from the porous glass base material 10 (non-uniformly in a glass thickness direction), and formed in a patchy fashion in the peripheral direction of the furnace core tube 4 (non-uniformly in a circumferential direction).

If a portion in which the crystallization of the furnace core tube 4 in the downstream region 21 advances in a patchy fashion is heated when the porous glass base material 10 after the heat treatment passes through the furnace core tube 4, coefficients of thermal expansion in the crystallized portion and the uncrystallized portion are different from each other. This causes a difference between the degrees of deformation of the furnace core tube 4. The difference between the coefficients of thermal expansion was found to cause tube cracks in a portion which the crystallization of the glass in the furnace core tube 4 non-uniformly occurs.

When the furnace core tube 4 in the downstream region 21 is thick, non-uniform crystallization is particularly remarkable. This reason is considered as follow: the amount of heat of the radiation heat from the porous glass base material 10 is smaller than that of a heater heating the heating region 20, which gradually causes the crystallization of the glass to proceed without causing the crystallization at once. For this reason, when the furnace core tube 4 in the downstream region 21 is thick, the cracks of the furnace core tube are apt to occur. Then, it has been found that the uniform crystallization of the downstream region 21 can be achieved by setting the thickness of the furnace core tube 4 in the downstream region 21 to be less than the thickness of the furnace core tube in the heating region 20. As a result, the present invention has been perfected.

Figure 1:
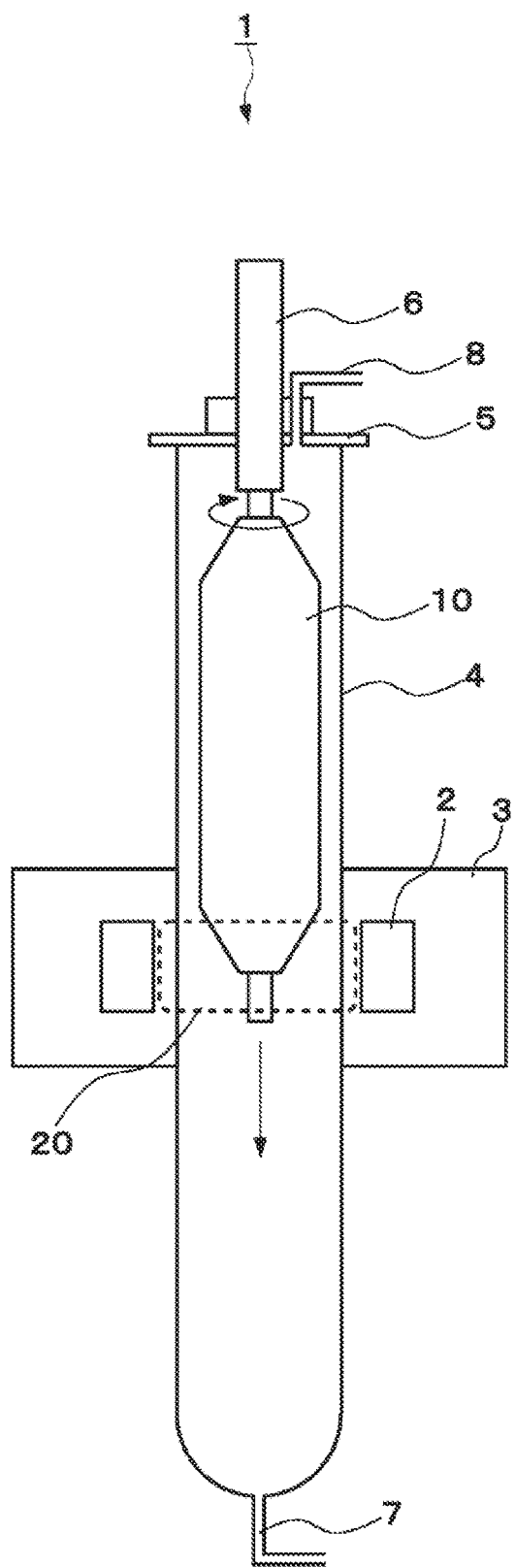
FIG. 1 is a schematic view showing the constitution of a heat treatment apparatus 1.

Hereinafter, with reference to the drawings, a heat treatment apparatus 1 according to an embodiment of the present invention will be described. The heat treatment apparatus 1 includes a heater 2 heating a heating region, a furnace body 3 covering the heater 2, and a furnace core tube 4 installed adjacent to the heater 2 on an inner side and made of silica glass, as with the heat treatment apparatus shown in FIG. 1.

The upper end of the furnace core tube 4 is closed by an upper lid 5 in which a penetration hole is opened. A support rod 6 supporting a porous glass base material 10 is attached to the upper lid 5 through the penetration hole. The support rod 6 supports the porous glass base material 10, and functions as a moving mechanism relatively moving the porous glass base material 10 in a single direction with respect to the heater 2 in the furnace core tube 4 in a state where the heating region is heated by the heater 2. The movement of the porous glass base material 10 supported by the support rod 6 is realized by the driving force of a motor which is not shown. The porous glass base material 10 is moved toward a lower side from an upper side when a heat treatment is performed. The porous glass base material 10 is moved so that the porous glass base material 10 successively passes through the heating region 20 to the upper end of the porous glass base material 10 from the lower end thereof in a state where the heating region 20 is heated by the heater 2. A gas introduction port 7 for supplying a process gas such as a helium gas or a chlorine gas is provided in the lower part of the furnace core tube 4. A gas exhaust port 8 for exhausting a gas is provided in the upper lid 5.

Figure 3A:
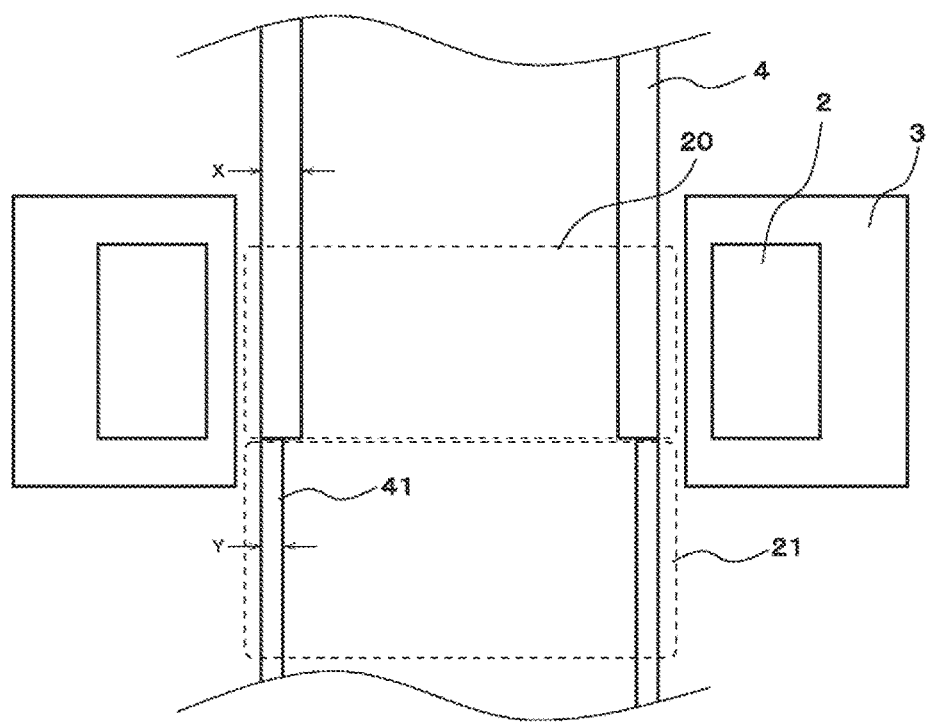
FIGS. 3A and 3B are enlarged views schematically showing a heating region 20 and its circumference in a heat treatment apparatus of the present invention.
Figure 3B:
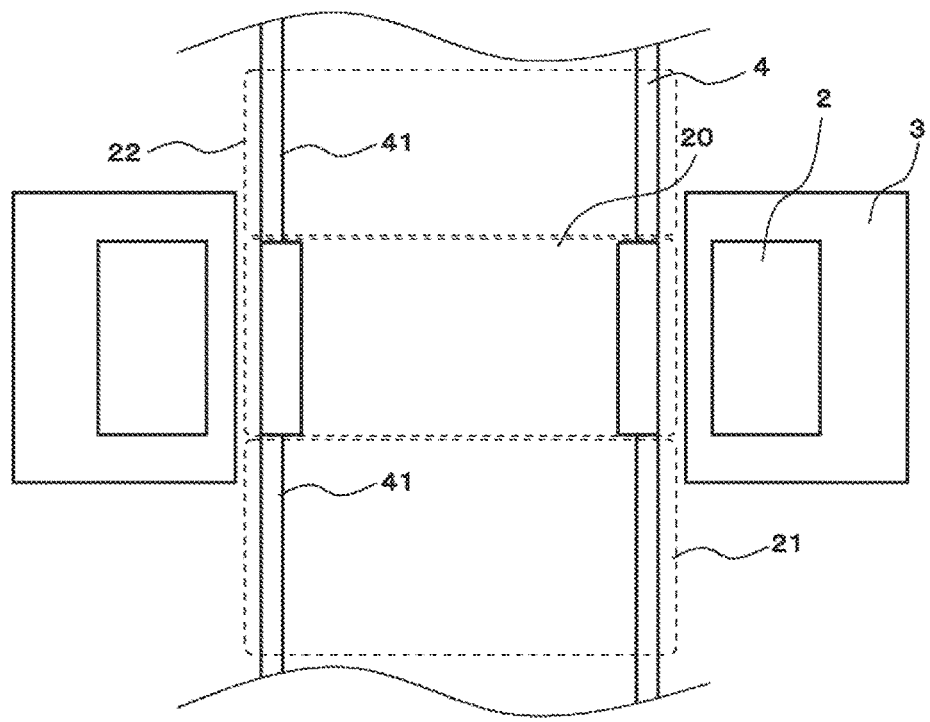

In the present embodiment, as shown in FIGS. 3A and 3B, a thin-walled part 41 having a thickness of glass less than that of a portion located in the heating region 20 is provided in a region adjacent to the heating region 20 in the furnace core tube 4. When the thickness of the furnace core tube 4 in the heating region 20 is defined as X mm, and the thickness of the thin-walled part 41 is defined as Y mm, $Y/X \leq 0.75$ (that is, the thickness of the thin-walled part 41 is 75% or less of the thickness of the glass of the furnace core tube 4 of the heating region 20) may be set, and may be specifically from 4 mm to 6 mm.

The thin-walled part 41 may be provided in a region 21 adjacent to the heating region 20 on a lower side in the furnace core tube 4 (that is, a downstream region adjacent to the heating region 20 on a downstream side for the moving direction of the porous glass base material 10 when passing through the heating region 20). This can suppress cracks occurring in the furnace core tube 4 in the portion located in the downstream region 21 in the furnace core tube 4. The thin-walled part 41 may be provided in not the downstream region 21 but a region 22 adjacent to the heating region 20 on an upper side in the furnace core tube 4 (that is, a region adjacent to the heating region 20 on an upstream side for the moving direction of the porous glass base material 10 when passing through the heating region 20 (hereinafter, referred to as an "upstream region")). When glass base material 10 is moved upward in order to remove the glass base material 10 subjected to the heat treatment from the upper part of the furnace core tube 4, the radiation heat may cause the vitrification of the furnace core tube 4 also in the upstream region 22 of the heating region. Thereby, the thickness of the portion located in the upstream region 22 in the furnace core tube 4 is decreased, which can suppress cracks occurring in the furnace core tube 4 in the upstream region 22.

The thin-walled part 41 may be provided only in one of the portions located in the downstream region 21 and the upstream region 22 in the furnace core tube 4. The thin-walled part 41 may be provided in each of the portions.

The thickness of the thin-walled part 41 provided in the downstream region 21 and/or the upstream region 22 is preferably decreased by setting the inner diameter of the thin-walled part 41 to be greater than the inner diameter of the furnace core tube 4 in the heating region 20 as shown in FIGS. 3A and 3B. Thus, the distance between the heated porous glass base material 10 and the thin-walled portion can be increased, which can suppress the influence of the radiation heat from the heated porous glass base material 10.

The thickness of a portion of the furnace core tube 4 which is sufficiently separated from the heating region 20 and is located in a region in which the crystallization of the glass does not occur under the influence of the radiation heat caused by the heated porous glass base material 10 may be the same as the thickness of the thin-walled part 41, or may be the same as the thickness of the glass of the furnace core tube 4 in the heating region 20 in order to secure the strength.

The furnace core tube 4 having the above structure may be produced by joining silica glass tubes having different inner diameters according to thermal processing. The furnace core tube 4 may be produced by decreasing the thickness of a partial region of a silica glass tube having a constant inner diameter according to grinding or polishing.

It is preferable that the portion located in the heating region 20 in the furnace core tube 4 is previously heated by the heater 2 to crystallize the glass.

When the furnace core tube 4 described above is used in a state where it is installed in the heat treatment apparatus 1, cracks are less likely to occur in the furnace core tube 4 as compared with conventional one, which makes it possible to repeatedly use the furnace core tube 4 for a long period of time.

EXAMPLE

Figure 4:
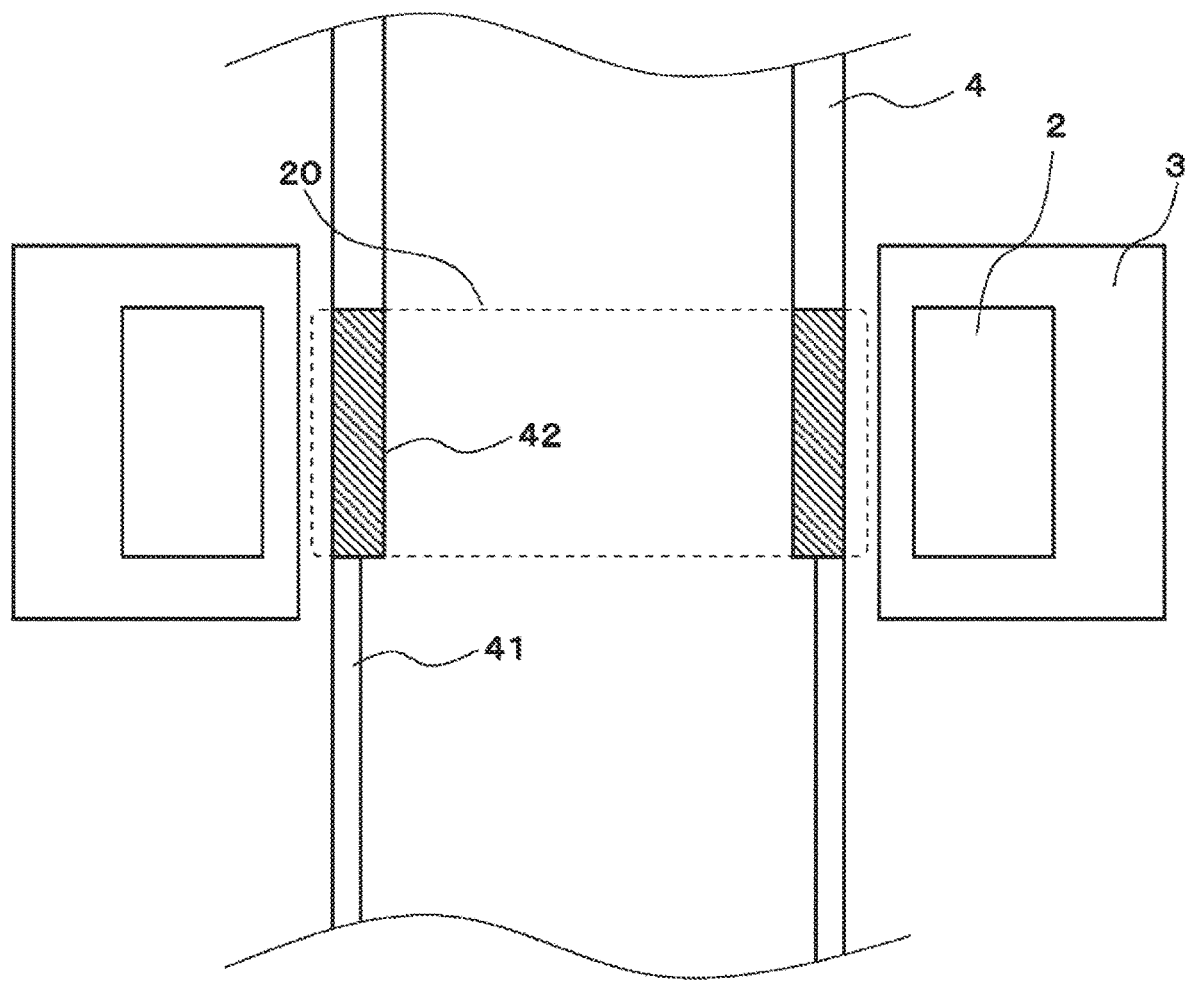
FIG. 4 is an enlarged view schematically showing the heating region 20 and its circumference after a heat treatment (aging treatment) in the heat treatment apparatus of the present invention.

A new furnace core tube 4 having an inner diameter of 374 mm, a glass thickness of 8 mm above the lower end position of a heater 2, and a glass thickness of 4 mm below the lower end position was attached to a glass base material heat treatment apparatus 1. In a state where the internal pressure of the furnace core tube 4 was maintained at atmospheric pressure, a heat treatment (aging treatment) was performed by the heater 2. The heat treatment was carried out at a heating temperature at 1300° C. for a heating time of 240 hours. In the furnace core tube 4 after the heat treatment, glass was crystallized in a heating region 20 located on the inner side of the heater 2 shown in FIG. 4 (reference number 42 in FIG. 4).

Figure 5:
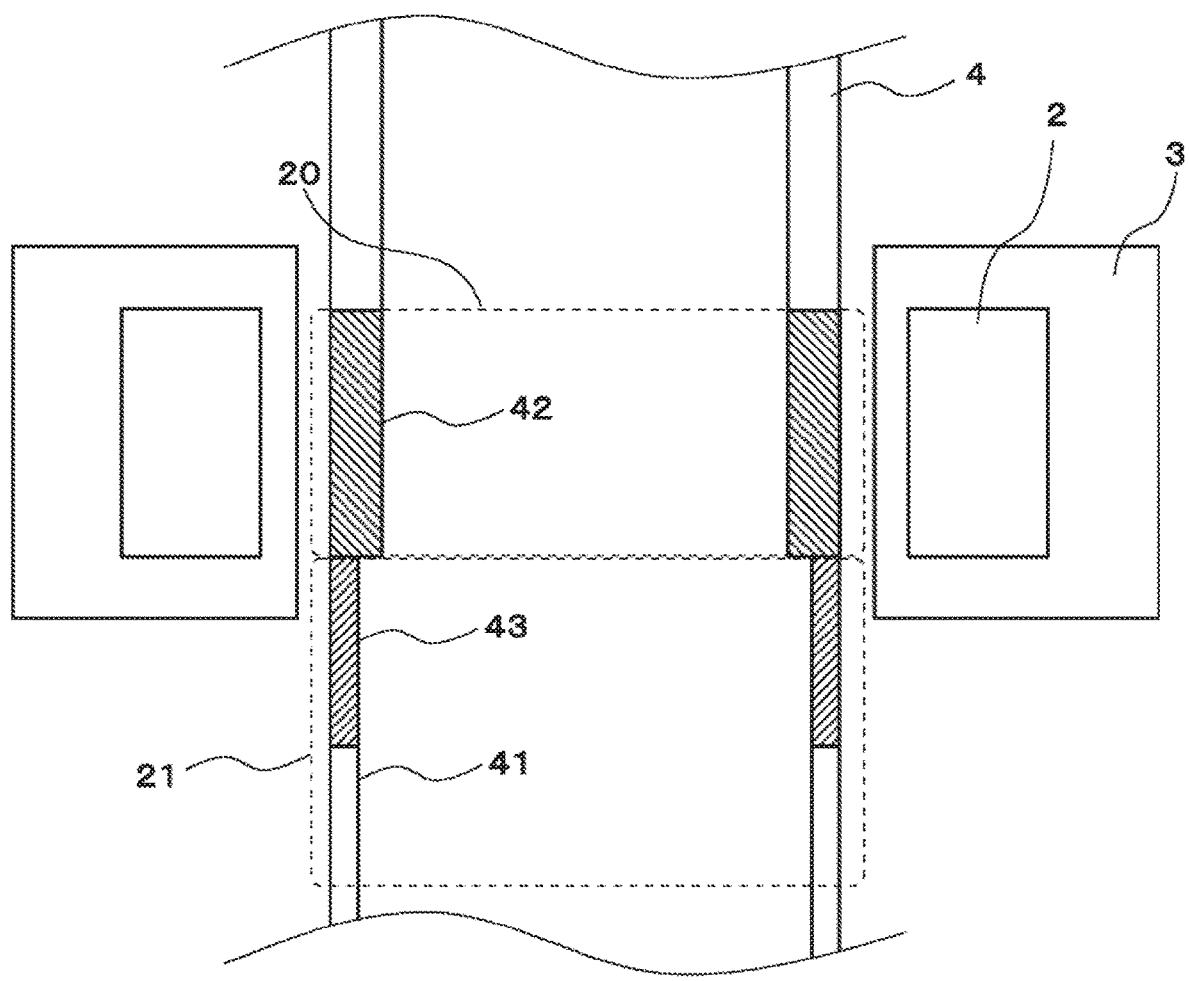
FIG. 5 is an enlarged view schematically showing the heating region 20 and its circumference after repeatedly subjecting a porous glass base material 10 to a heat treatment in the heat treatment apparatus of the present invention.

Then, in a state where a porous glass base material 10 having an outer diameter of 340 mm was inserted into the furnace core tube 4, the porous glass base material 10 was subjected to a heat treatment at a heating temperature of 1500° C. and a reduction speed of 1.5 mm/min while a helium gas and a chlorine gas were introduced. As shown in FIG. 5, the crystallization of glass gradually occurred on the lower side 21 of the lower end position of the heater 2 (that is, a downstream region adjacent to the heating region 20 on a downstream side for the moving direction of the porous glass base material 10 when passing through the heating region 20) by radiation heat from the porous glass base material 10 subjected to the heat treatment when passing through the heating region 20 adjacent to the heater 2 (reference number 43 in FIG. 5). When the number of repetition of the heat treatment of the porous glass base material 10 reached about 100, the proceeding of the crystallization stopped, and the heat treatment could be then further performed over 100 times.

COMPARATIVE EXAMPLE

Figure 6:
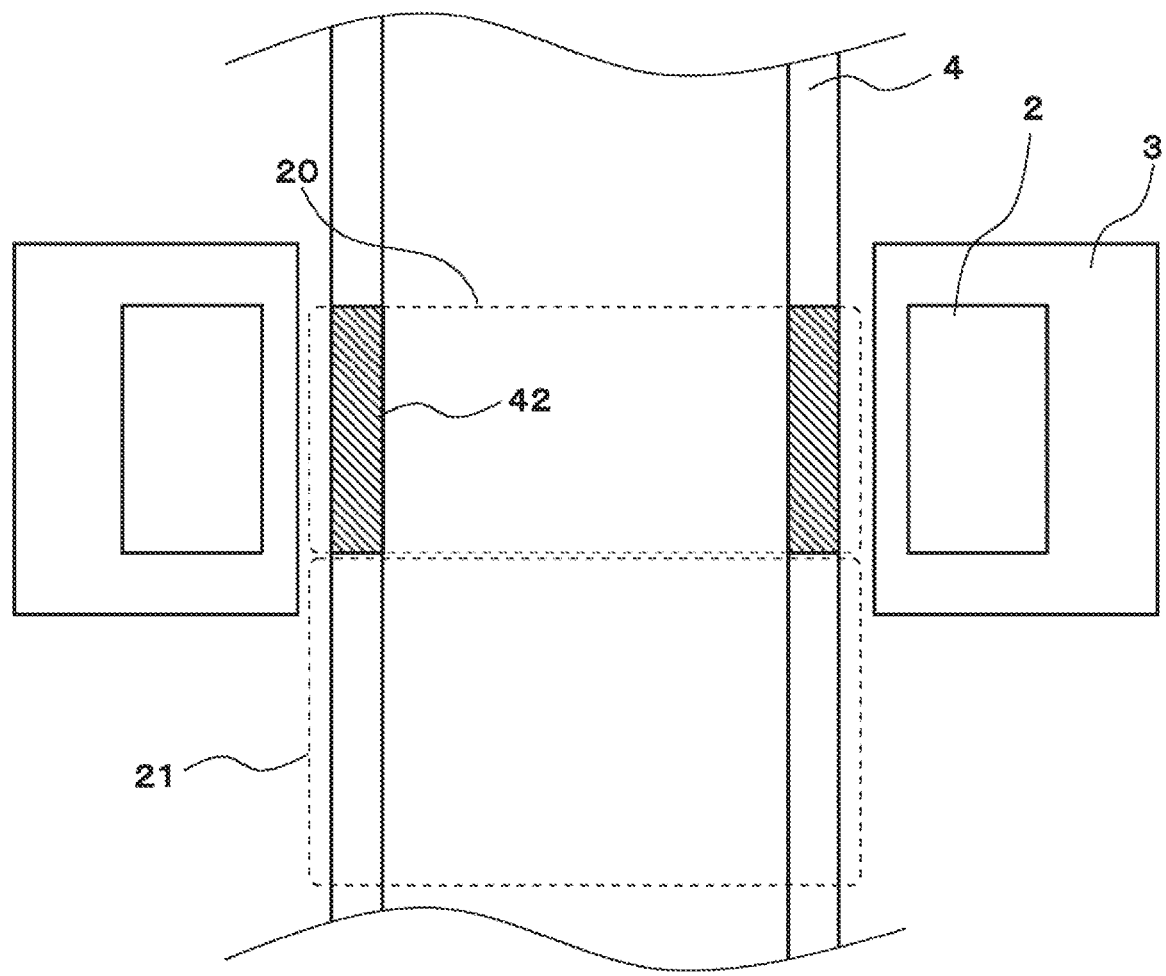
FIG. 6 is an enlarged view schematically showing the heating region 20 and its circumference after a heat treatment (aging treatment) in the conventional heat treatment apparatus.

A new furnace core tube 4 having an inner diameter of 374 mm and a glass thickness of 8 mm was attached to a glass base material heat treatment apparatus 1. In a state where the internal pressure of the furnace core tube 4 was maintained at atmospheric pressure, a heat treatment (aging treatment) was performed by a heater 2. The heat treatment was carried out at a heating temperature at 1300° C. for a heating time of 240 hours. In the furnace core tube 4 after the heat treatment, in the same manner as in Example, glass was crystallized in a heating region 20 located on the inner side of the heater 2 shown in FIG. 6 (reference number 42 in FIG. 6).

Then, in a state where a porous glass base material 10 having an outer diameter of 340 mm was inserted into the furnace core tube 4, the porous glass base material 10 was subjected to a heat treatment at a heating temperature of 1500° C. and a reduction speed of 1.5 mm/min while a helium gas and a chlorine gas were introduced. The crystallization of glass gradually occurred in a region 21 located on the lower side of the lower end position of the heater 2 (that is, a downstream region adjacent to the heating region 20 on a downstream side for the moving direction of the porous glass base material 10 when passing through the heating region 20) by radiation heat from the porous glass base material subjected to a heat treatment when passing through the heating region 20 adjacent to the heater 2. When the number of repetition of the heat treatment of the porous glass base material 10 reached about 80, the furnace core tube 4 was cracked due to the difference of the coefficients of thermal expansion between the crystallized portion and the uncrystallized portion.

What is claimed is:

1. A heat treatment apparatus comprising:
   a furnace core tube made of silica glass;
   a heater provided adjacent to the furnace core tube, the heater heating a heating region; and
   a support rod supporting a porous glass base material and relatively moving the porous glass base material with respect to the heater in the furnace core tube in a state where the heating region is heated by the heater to make the porous glass base material pass through the heating region,
   wherein the heat treatment apparatus includes a thin-walled part provided in a region adjacent to a portion located in the heating region in the furnace core tube, the thin-walled part having a thickness of glass less than that of the portion located in the heating region, and
   wherein the thickness of the thin-walled part is decreased by setting an inner diameter of the thin-walled part to be greater than an inner diameter of the furnace core tube in the heating region.

2. The heat treatment apparatus according to claim 1, wherein the thickness of the glass of the thin-walled part is 75% or less of the thickness of the glass of the furnace core tube in the heating region.

3. The heat treatment apparatus according to claim 1, wherein the thickness of the glass of the thin-walled part is from 4 mm to 6 mm.

4. The heat treatment apparatus according to claim 1, comprising the thin-walled part provided in a downstream region adjacent to the heating region on a downstream side for a moving direction of the porous glass base material when passing through the heating region.

5. The heat treatment apparatus according to claim 1, wherein the portion located in the heating region in the furnace core tube is previously heated by the heater to crystallize the glass.

* * * * *